United States Patent
Mandal et al.

(10) Patent No.: US 12,393,405 B1
(45) Date of Patent: Aug. 19, 2025

(54) ENHANCE CODEGEN EFFICIENCY BY ELIMINATING REDUNDANT CONTEXTS IN LOSSLESS MANIFOLD OPTIMIZATION

(71) Applicant: Intuit Inc., Mountain View, CA (US)

(72) Inventors: Sumangal Mandal, Kolkata (IN); Vaishali Gupta, New Delhi (IN); Amit Kaushal, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/195,490

(22) Filed: Apr. 30, 2025

(51) Int. Cl.
*G06F 8/35* (2018.01)
*G06F 8/36* (2018.01)
*G06F 11/3668* (2025.01)
*G06F 16/901* (2019.01)

(52) U.S. Cl.
CPC .............. *G06F 8/35* (2013.01); *G06F 8/36* (2013.01); *G06F 11/3684* (2013.01); *G06F 16/9024* (2019.01)

(58) Field of Classification Search
None
See application file for complete search history.

(56) References Cited

U.S. PATENT DOCUMENTS

2025/0133037 A1* 4/2025 Jensen .................... H04L 51/02

FOREIGN PATENT DOCUMENTS

| CN | 117271780 A | * | 12/2023 | ............. G06F 16/35 |
| CN | 118312153 A | * | 7/2024 | ............. G06F 8/41 |
| CN | 119848841 A | * | 4/2025 | ............. G06F 21/57 |

OTHER PUBLICATIONS

Dong, "Compressing Context to Enhance Inference Efficiency of Large Language Models", 2023, arXiv (Year: 2023).*
Pan, "Enhancing Repository-Level Code Generation with Integrated Contextual Information", 2024, arXiv (Year: 2024).*
Jiang et al., "LongLLMLingua: Accelerating and Enhancing LLMs in Long Context Scenarios via Prompt Compression", arXiv:2310.06839v2, Aug. 12, 2024, 20 Pages.
Pan et al., "Enhancing Repository-Level Code Generation with Integrated Contextual Information", arXiv:2406.03283v1, Jun. 5, 2024, 11 Pages.
Huang et al., "Recurrent Context Compression: Efficiently Expanding the Context Window of LLM", arXiv:2406.06110v1, Jun. 10, 2024, 13 Pages.

* cited by examiner

*Primary Examiner* — Hossain M Morshed
(74) *Attorney, Agent, or Firm* — Dinsmore & Shohl LLP

(57) ABSTRACT

Certain aspects of the disclosure provide a method for code generation, including: selecting a code generation use case type; identifying the target entity in a graph knowledge base; extracting a graph segment of the graph knowledge base; identifying a set of methods in the graph segment; identifying a first method of the set of methods that has a largest context size of the set of methods; determining an overlapping context size between the first method and each other method of the set of methods, and selecting a maximum number of other methods of the set of methods in order of decreasing overlapping context size with respect to the first method, such that a total context size of the maximum number of other methods of the set of methods and the first method does not exceed a maximum context window size associated with a machine learning model.

20 Claims, 11 Drawing Sheets

Iteration 1

Buckets (max allowed size 60):
Total size of the bucket: 0

| Selected method | Context token sizes | Total context size |
|---|---|---|
|  |  |  |

Methods:

| Method | Context token sizes | Total context size |
|---|---|---|
| calculateAverageScore | 10, 11, 9 | 30 (10+11+9) |
| validateUserCredentials | 11, 21, 25 | 57 (11+21+25) |
| retrieveAllProducts | 21, 25, 2 | 48 (21+25+2) |
| updateEmployeeRecord | 11, 18, 9 | 38 (11+18+9) |
| sortStudentList | 11, 2, 4 | 17 (11+2+4) |
| saveOrderDetails | 11, 16 | 27 (11+16) |

Step 1:

Buckets (max allowed size 60):
Total size of the bucket: 57 (11+21+25)

| Selected method | Context token sizes | Total context size |
|---|---|---|
| validateUserCredentials | 11, 21, 25 | 57 |

Methods:

| Method | Context token sizes | Total context size | Total overlapping context | Total context difference |
|---|---|---|---|---|
| retrieveAllProducts | 21, 25, 2 | 48 | 46 (21+25) | 2 |
| calculateAverageScore | 10, 11, 9 | 30 | 21 (10+11) | 9 |
| sortStudentList | 11, 2, 4 | 17 | 11 | 6 (2+4) |
| saveOrderDetails | 11, 16 | 27 | 11 | 16 |
| updateEmployeeRecord | 11, 18, 9 | 38 | 11 | 27 (18+9) |

Step 2:

Buckets (max allowed size 60):
Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Methods:

| Method | Context token sizes | Total context size | Total overlapping context | Total context difference |
|---|---|---|---|---|
| calculateAverageScore | 10, 11, 9 | 30 | 21 (10+11) | 9 |
| sortStudentList | 11, 2, 4 | 17 | 11 | 6 (2+4) |
| saveOrderDetails | 11, 16 | 27 | 11 | 16 |
| updateEmployeeRecord | 11, 18, 9 | 38 | 11 | 27 (18+9) |

*FIG. 4*

Iteration 2

Step 1:

Buckets (max allowed size 60):
Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Total size of the bucket: 38 (11+18+9)

| Selected method | Context token sizes | Total context size |
|---|---|---|
| updateEmployeeRecord | 11, 18, 9 | 38 |

Methods:

| Method | Context token sizes | Total context size | Total overlapping context | Total context difference |
|---|---|---|---|---|
| sortStudentList | 11, 2, 4 | 17 | 11 | 6 (2+4) |
| saveOrderDetails | 11, 16 | 27 | 11 | 16 |
| calculateAverageScore | 10, 11, 9 | 30 | 11 | 19 (10+9) |

Step 2 (a):

Buckets (max allowed size 60):
Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Total size of the bucket: 44 (11+18+9+2+4)

| Selected method | Context token sizes | Total context size |
|---|---|---|
| updateEmployeeRecord | 11, 18, 9 | 38 |
| sortStudentList | 11, 2, 4 | 17 |

Methods:

| Method | Context token sizes | Total context size | Total overlapping context | Total context difference |
|---|---|---|---|---|
| saveOrderDetails | 11, 16 | 27 | 11 | 16 |
| calculateAverageScore | 10, 11, 9 | 30 | 11 | 19 (10+9) |

Step 2 (b):

Buckets (max allowed size 60):
Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Total size of the bucket: 60 (11+18+9+2+4+16)

| Selected method | Context token sizes | Total context size |
|---|---|---|
| updateEmployeeRecord | 11, 18, 9 | 38 |
| sortStudentList | 11, 2, 4 | 17 |
| saveOrderDetails | 11, 16 | 27 |

Methods:

| Method | Context token sizes | Total context size | Total overlapping context | Total context difference |
|---|---|---|---|---|
| calculateAverageScore | 10, 11, 9 | 30 | 11 | 19 (10+9) |

*FIG. 5*

Iteration 3

Step 1:

Buckets (max allowed size 60):

Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Total size of the bucket: 60 (11+18+9+2+4+16)

| Selected method | Context token sizes | Total context size |
|---|---|---|
| updateEmployeeRecord | 11, 18, 9 | 38 |
| sortStudentList | 11, 2, 4 | 17 |
| saveOrderDetails | 11, 16 | 27 |

Total size of the bucket: 30 (10 + 11 + 9)

| Selected method | Context token sizes | Total context size |
|---|---|---|
| calculateAverageScore | 10, 11, 9 | 30 |

Methods:

| Method | Context token sizes | Total context size | Total overlapping context | Total context difference |
|---|---|---|---|---|

*FIG. 6*

Methods:

| Method | Context token sizes | Total context size |
|---|---|---|
| calculateAverageScore | 10, 11, 9 | 30 (10+11+9) |
| validateUserCredentials | 11, 21, 25 | 57 (11+21+25) |
| retrieveAllProducts | 21, 25, 2 | 48 (21+25+2) |
| updateEmployeeRecord | 11, 18, 9 | 38 (11+18+9) |
| sortStudentList | 11, 2, 4 | 17 (11+2+4) |
| saveOrderDetails | 11, 16 | 27 (11+16) |

Total number of LLM calls = 6
Total tokens sent to method = 30 + 57 + 48 + 38 + 17 + 27 = 217

Buckets (max allowed size 60):
Total size of the bucket: 59 (11+21+25+2)

| Selected method | Context token sizes | Total context size |
|---|---|---|
| validateUserCredentials | 11, 21, 25 | 57 |
| retrieveAllProducts | 21, 25, 2 | 48 |

Total size of the bucket: 60 (11+18+9+2+4+16)

| Selected method | Context token sizes | Total context size |
|---|---|---|
| updateEmployeeRecord | 11, 18, 9 | 38 |
| sortStudentList | 11, 2, 4 | 17 |
| saveOrderDetails | 11, 16 | 27 |

Total size of the bucket: 30 (10 + 11 + 9)

| Selected method | Context token sizes | Total context size |
|---|---|---|
| calculateAverageScore | 10, 11, 9 | 30 |

Total number of LLM calls = 3
Total tokens sent to method = 59 + 60 + 30 = 149

The number of LLM calls is reduced by 50% (6 - 3 = 3)
Total tokens sent is reduced by 31.96% (219 - 149 = 70)

FIG. 7

ENHANCE CODEGEN EFFICIENCY BY ELIMINATING REDUNDANT CONTEXTS IN LOSSLESS MANIFOLD OPTIMIZATION

BACKGROUND

Field

Aspects of the present disclosure relate to generative artificial intelligence.

Description of Related Art

Generative artificial intelligence (GenAI) refers to machine learning models that are able to create new content based on patterns and information learned from training data in combination with a user prompt. The user prompt provides instructions to the model on what new content to generate and how to generate that new content. Notably, the model is able to generate new content based on both the actual information (e.g., facts and knowledge) included in the training data, as well as patterns, insights, and model parameter weights learned from the training data.

GenAI models are able to generate new content in many different forms, including text, image, audio, and even video. For example, to facilitate text generation, some GenAI models are configured as language models (LMs). An LM is generally a type of machine learning model that is designed to understand, generate, and manipulate human language. More specifically, an LM is a probabilistic framework that determines the likelihood of a sequence of words or tokens. At its core, an LM attempts to predict the probability of the next word in a sentence given the preceding words. The model estimates these probabilities based on the patterns it learned during training. LMs are useful in natural language processing (NLP) and computational linguistics for performing a range of tasks involving human language.

LMs have a wide array of applications, including: text generation (e.g., producing coherent and contextually appropriate text; machine translation (e.g., converting text from one language to another); speech recognition (e.g., converting spoken language into text); text summarization (e.g., condensing a long piece of text into a shorter summary); sentiment analysis (e.g., determining the sentiment expressed in a piece of text); and question answering (e.g., automatically providing answers to questions posed in natural language).

SUMMARY

Certain aspects provide a method for curating source code contexts for response generation. The method includes selecting a type of a code generation use case to generate for a target entity referenced in source code; identifying the target entity in a graph knowledge base corresponding to the source code, the graph knowledge base comprising a set of nodes representing a set of entities identified in the source code and a set of edges indicating relationships between entities of the set of entities; extracting a graph segment of the graph knowledge base by identifying one or more entities related to the target entity based on the type of the code generation use case to be generated; identifying a set of methods in the graph segment; determining at least one subset of methods from the set of methods in the graph segment, including: identifying a first method of the set of methods that has a largest context size of the set of methods, determining an overlapping context size between the first method and each other method of the set of methods, and selecting a maximum number of other methods of the set of methods in order of decreasing overlapping context size with respect to the first method, such that a total context size of the maximum number of other methods of the set of methods and the first method does not exceed a maximum context window size associated with a machine learning model; and providing the at least one subset of methods to the machine learning model to generate code for the code generation use case.

Other aspects provide processing systems configured to perform the aforementioned methods as well as those described herein; non-transitory, computer-readable media comprising instructions that, when executed by a processors of a processing system, cause the processing system to perform the aforementioned methods as well as those described herein; a computer program product embodied on a computer readable storage medium comprising code for performing the aforementioned methods as well as those further described herein; and a processing system comprising means for performing the aforementioned methods as well as those further described herein.

The following description and the related drawings set forth in detail certain illustrative features of one or more aspects.

DESCRIPTION OF THE DRAWINGS

The appended figures depict certain aspects and are therefore not to be considered limiting of the scope of this disclosure.

FIGS. 4-7 depict various example diagrams for performing one or more iterations of curating context to perform enhanced code generation.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
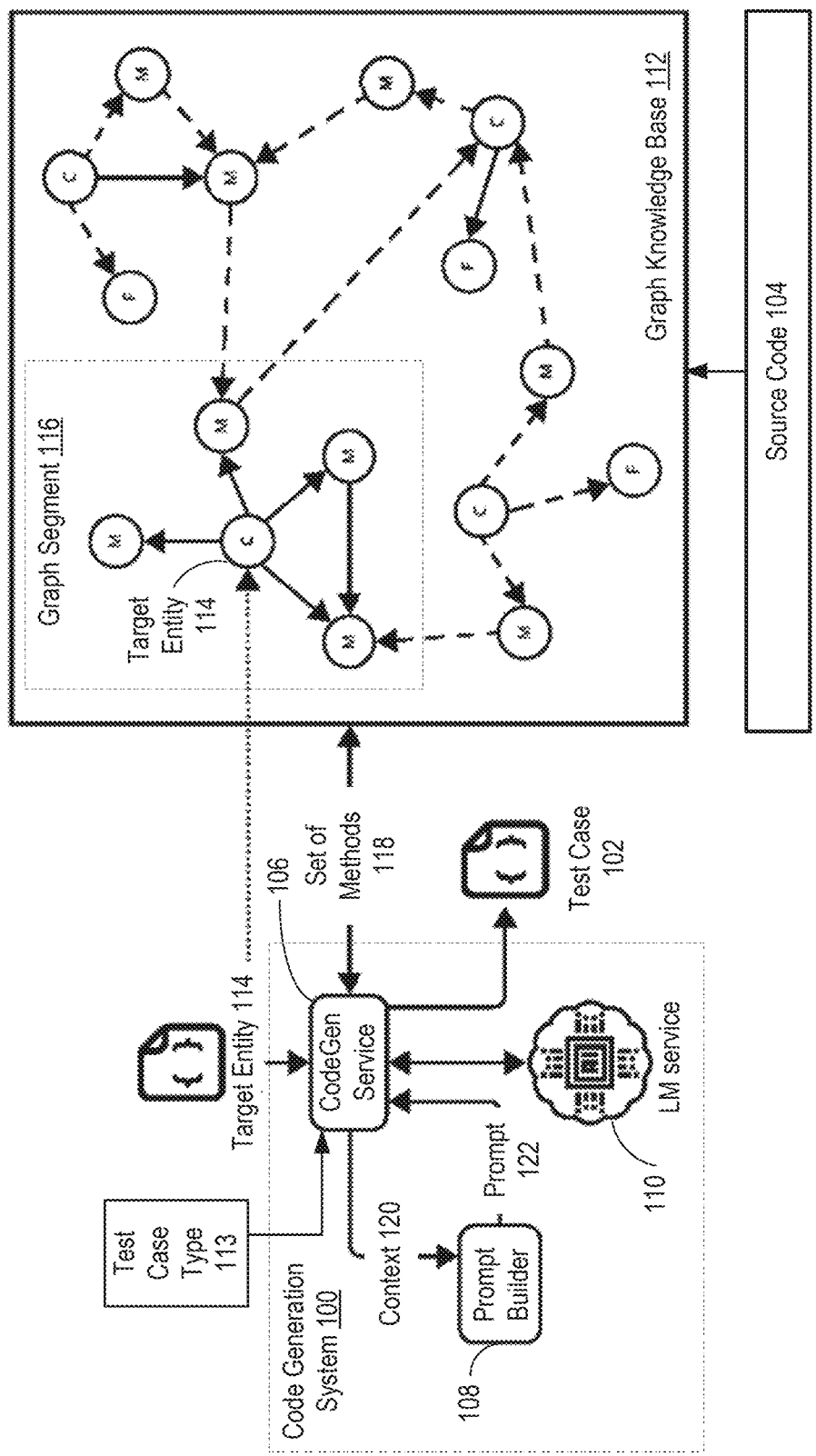
FIG. 1 depicts an example diagram of a code generation system.

As mentioned above, LMs are GenAI models that are capable of understanding and generating human-readable text across a plurality of different domains. LMs operate by processing sequences of tokens as input and predicting subsequent tokens based on learned patterns and relationships. However, LMs cannot process unlimited amounts of tokens at one time. Instead, LMs have a "context window," which generally refers to the fixed-length sequence of tokens that the model can process simultaneously during inferences. The context window serves as the model's working memory, storing the information available to the model when generating a response. Within this context window, the model should maintain all relevant information from the user's input, any provided documents or code, and the on-going conversation history. Depending on the specific architecture and training of an LM, the context window can range from a few thousand to hundreds of thousands of tokens. Notably, larger context windows beneficially allow for more input and context to be provided to the LM resulting in higher quality outputs, but at the cost of larger amounts of computational resources and time to process the inputs and generate the outputs.

A limitation of existing LM technology is the finite size of context windows. When the accumulated tokens exceed the model's context window capacity, information is truncated, typically by removing the oldest information to accommodate new inputs—or by truncating ending portions of inputs. This truncation occurs regardless of the information's relevance or importance to the current task, potentially eliminating critical context needed for accurate and useful responses. When such critical context is eliminated, the model's output can experience significant degradation in terms of relevance, quality, and even increase the likelihood of hallucinations within the model responses.

Various approaches have been developed to mitigate context window limitations. One technique involves summarizing the inputs by compressing portions of the input context into condensed representations before being provided to the model. These summarization techniques attempt to identify and preserve key elements of the context, while removing or including fewer details about less relevant information. Current summarization methods include extractive techniques that select certain sentences or segments verbatim or abstractive techniques that paraphrase content into shorter forms. These methods often employ additional models to help identify salient information, perform semantic clustering to group related concepts, and determine importance scoring algorithms to prioritize retention of certain information over other information.

While summarization approaches have shown some efficacy in general text applications such as news article or data summarization in mitigating context window limitations, some context is still always lost in the compression process. In natural language contexts, this trade-off may be acceptable, but in other applications, such as code generation, this context loss may lead to more significant technical problems. Software development applications include tasks for code generation, debugging, refactoring, and creating documentation. Source code is provided to the model as context for generating new code or for modifying the existing source code. Source code, by its nature, contains dense, interconnected information where understanding may require simultaneous access to multiple components, class definitions, function implementations, variable declarations, and imported libraries, which may be separated into different portions or files of the source code. Thus, even minor syntax details, such as variable types, function parameter orders, or import statements, can be critical to generating functional, bug-free code.

Furthermore, code elements maintain complex dependencies that may not be apparent without the full code context. For example, a function call may depend on a class definition, which itself inherits from a base class defined elsewhere. If any element in this chain is removed, either due to truncation or during a summarization process, the model may generate code that appears plausible but contains errors, such as incorrect method statements, incompatible type variables, or incorrect dependencies. Thus, unlike natural language, where approximate understanding may suffice for content generation, code generation requires precise adherence to syntax, semantic rules, and existing code patterns as they exist in the full version of the source code.

Other methods that have been employed to mitigate the context window limitations include removing lower perplexity tokens of model prompts, utilizing transformer-based compression to retain complete historical information with fixed-length short sequences, and merging summarized code with extracted code dependencies. However, each of these methods also suffer from the technical problem associated with context compression in that information is lost during the compression process.

Accordingly, systems and methods for code generation are described herein that provide technical solutions and benefits over existing code generation systems. In particular, aspects of the disclosed systems and methods are directed to code generation systems that are configured to curate code contexts extracted from a graph knowledge base and identify redundancies in different portions of the code contexts. These redundancies can then be eliminated in order to reduce both the overall token size and the number of calls made to the code generation model without losing critical information needed to perform the code generation task.

In some aspects, aspects of the code generation systems are configured to identify entities in the source code, such as classes, methods, and fields, and parse the source code based on the identified entities. The code generation systems can then generate a graph knowledge base that represents the entities from the parsed source code. For example, the graph knowledge base comprises a plurality of nodes that represent the identified entities and a plurality of edges between nodes, where each edge represents a relationship between two or more entities (represented by nodes). For example, an edge can represent a relationship between a first method that references a second method, or a class that defines a variable for particular field.

By parsing the source code and generating a graph knowledge base in this manner, the graph knowledge base maintains both the entities and the relationships between entities included in the source code, while also reducing the overall context size of the source code. Aspects of the code generation systems can then extract graph segments from the graph knowledge base, which are portions of the graph knowledge base that contain the relevant information needed to perform a specific code generation task. In some aspects, the graph segments are extracted by identifying a target entity and one or more additional entities that are related to the target entity. A target entity refers to the class, method, or field that is the focus of the code generation task, such as generating a unit test for a particular method or documentation for a particular class. Entities may be directly or indirectly related to the target entity based on a first degree, second degree, or higher degree connection to the target entity.

After traversing the graph knowledge base to identify the relevant contexts for the desired generation task, the code generation systems are configured to further compress the graph segment. The lossless compression is performed by identifying overlapping contexts between different methods identified in the graph segment and grouping the methods in way that overlapping contexts can be eliminated to reduce context size without losing critical information for the generation task. To group the methods, the code generation systems determine a context size of each method identified in the graph segment and then sorts the set of methods by descending order of context size. The code generation systems then determine which method has the largest context size to be included in a first subset of methods. For each remaining method, the systems calculate the overlapping context size and the context difference size with respect to the method with the largest context size.

The code generation systems are configured to add the method with the largest overlapping context size and continue adding methods with the next largest overlapping context size, to the first subset of methods, so long as the total context size of the subset of methods does not exceed the maximum context window size of the LM being used to perform the code generation task. If one or more methods have the same overlapping context size, methods may also be sorted in order of increasing context difference size. Thus, in some aspects, additional methods are added in order of increasing overlapping context size and in order of decreasing context difference size. If adding a method would result in the subset exceeding the maximum context window size, the code generation systems are configured to perform an additional iteration of the context curation process and create additional subsets of methods until all methods originally identified in the graph segment are assigned to a subset of methods. By generating subsets of methods in this manner, overlapping contexts can be identified and redundant contexts in additional methods can be eliminated, thereby reducing the token size of each subset of methods. Each subset of methods is then provided to the LM to perform the code generation task, resulting in both a reduction in the number of calls to the LM and a reduction in the number of overall tokens being processed.

Thus, technical benefits are achieved because by reducing calls and context sizes, the code generation systems are able to utilize fewer computational resources than existing methods for code generation. For example, compute, memory, and power usage are all reduced, in addition to the possibility of network traffic for moving data to and from an LM. Additionally, aspects of the disclosed code generation systems also mitigate the limitations of the context window size of LMs by reducing the context to fall within the context window size without truncating or summarizing content. This allows for context compression without information loss, and in particular without omitting critical information needed for code generation tasks. Additionally, because the context compression occurs in stages (e.g., the three stages above)—at the graph knowledge base generation, the graph segment extraction, and the content curation, more context can be provided as represented by fewer tokens than if the original source code was being used as the context for the code generation task. This allows the code generation systems to provide more information in the context inputs without exceeding the context window size of the LM. This is beneficial because LMs typically operate better and can produce more relevant outputs when more context is provided.

Code Generation Systems

FIG. 1 depicts an example diagram of code generation system 100, which is an automated system that generates computer code based on existing code, input context, and/or instructions on how to modify existing code or generate new code. In some aspects, code generation system 100 comprises a code generation service (e.g., CodeGen service 106), prompt builder 108, and LM service 110.

CodeGen service 106 is configured to receive, process, and route data between the various components to facilitate code generation. Prompt builder 108 is configured to create, structure, and refine input instructions for AI systems, like LM service 110. In some aspects, prompt builder 108 is configured as a rules-based data generator, a machine learning model, or a generative AI model, like an LM. LM service 110 operates on an LM that is configured to generate code based on prompts generated by prompt builder 108 and other context that LM service 110 is provided. LM service 110 is able to generate code snippets, complete functions, or entire programs in any number of programming languages. In some aspects, LM service 110 is trained on large repositories of code, including source code, test cases, software specifications, and other metadata to train LM service 110. Accordingly, LM service 110 is trained to generate accurate, well-documented code that can be easily integrated back into the source code, run as a new program, or further processed by downstream applications. In some aspects, LM service 110 is a third-party service that utilizes commercially available generative AI models that are in communication with CodeGen service 106 through one or more application programming interfaces (APIs).

In some aspects, code generation system 100 is configured to generate code in the form of a test case 102 for source code 104. Test case 102 is one example of a code generation use case and comprises a set of inputs, execution conditions, and expected outputs that are designed to verify that a specific function or component of source code 104 is working as intended. For example, test case 102 may be run as a validation mechanism to identify bugs, ensure code reliability, and confirm that source code 104 meets the development and deployment requirements of the software application associated with source code 104. Some examples of test cases include unit tests, integration tests, and documentation.

A unit test is configured to test individual components or functions of a program in isolation to verify that the component or function correctly handles various inputs, returns the desired outputs, and handles errors in the inputs or execution. An integration test verifies that different modules or services in a software application work together correctly and tests the interactions between components and functions. Documentation refers to the organized set of instructions, references, and examples that explain how to use and interact with various functionalities of the software application. As an example, API documentation is a type of documentation that provides the instructions, references, and examples on how to use and interact with a software application's programming interface and can include details about available endpoints, request/response formats, authentication methods, error codes, and usage examples that help developers to correctly integrate with the API.

In order to generate test case 102, graph knowledge base 112 is generated based on source code 104 to provide a structured representation of source code 104. Graph knowledge base 112 comprises a set of nodes that represent entities, such as classes (C), methods (M), and fields (F), identified in source code 104 and a set of edges that indicate relationships between those entities, such as when certain entities reference or depend on other entities. Classes refer to the templates in object-oriented programming that define the structure and behavior of objects, allowing related data and functionality to be defined under a single classification. Methods are functions defined within one or more classes that perform specific operations associated with the classes. Thus, methods represent the actions that objects of a particular class can take. Fields refer to the variables declared within a class that store data or state information for objects created from the class. Aspects of generating graph knowledge base 112 are described in more detail with respect to FIG. 8.

CodeGen service 106 is configured to receive inputs that indicate a type of test case (e.g., test case type 113), such as a unit test, integration test, or documentation, to be generated and target entity 114 for which to generate test case 102. Target entity 114 may be a particular class, method, or field identified in source code 104 that needs further testing or development. Thus, test case 102 will be generated in order to verify that target entity 114 is working as intended in source code 104.

CodeGen service 106 is configured to identify target entity 114 in graph knowledge base 112 and extract the graph segment 116 by identifying one or more entities related to target entity 114 based on the type of desired test case that will be generated. One or more entities can be identified as being related to target entity 114 based on a first degree connection to target entity 114, based on a direct connection to another entity that has a first degree connection to target entity 114 (e.g., second degree connection to target entity 114), a higher degree connection to target entity 114, or other direct or indirect connection to target entity 114. Aspects of extracting the graph segment 116, including methods for extracting the graph segment based on a type of test case, are described in more detail in FIG. 9.

After extracting graph segment 116, CodeGen service 106 identifies a set of methods 118 included in graph segment 116. Beneficially, aspects of identifying the set of methods are directed to systems and methods for eliminating redundant contexts within the set of methods to reduce the computational resources needed to generate test case 102, which are described in more detail with respect to FIGS. 2-3 below.

CodeGen service 106 then provides the set of methods, test case type 113, and target entity 114 as context 120 to prompt builder 108. Prompt builder 108 uses context 120 to generate prompt 122, which is configured to instruct LM service 110 on how to use the set of methods to generate code for test case 102 based on target entity 114 and test case type 113. An example prompt may include one or more methods that refer to each other, a description of the test case, including: "Unit test scenario: update user with valid data description and test that a user can be successfully updated when valid data is provided", and corresponding instructions including: "Generate the unit test method using JUnit5 framework only. Generate the complete test class with single test method covering the given scenario in the description. Give appropriate method and class name. Mock the dependencies on objective method using Mockito. Appropriately initialize the Mockito framework. Add all necessary import statements."

CodeGen service 106 then routes prompt 122 to LM service 110 and receives one or more responses including computer code that will be used to implement test case 102. CodeGen service 106 is then configured to compile the responses from LM service 110 and output the test case 102. Users can execute test case 102 in their preferred development environment to verify that target entity 114 is functioning properly in source code 104 and corresponding software application.

Eliminating Redundant Contexts

As described above, a technical problem that arises with using LMs, such as LM service 110, centers around the size of context window of the LM being used. In the application of code generation, the context needed for generating new code often comprises token lengths exceeding the context window of the LM. However, if some of the context is truncated, the LM may not generate accurate code that can be integrated back into the source code or executed as stand-alone code. As described above, some existing systems attempt to summarize the context, however, this can lead to distortions in the code structure and dependencies or omit other important context.

Figure 2:
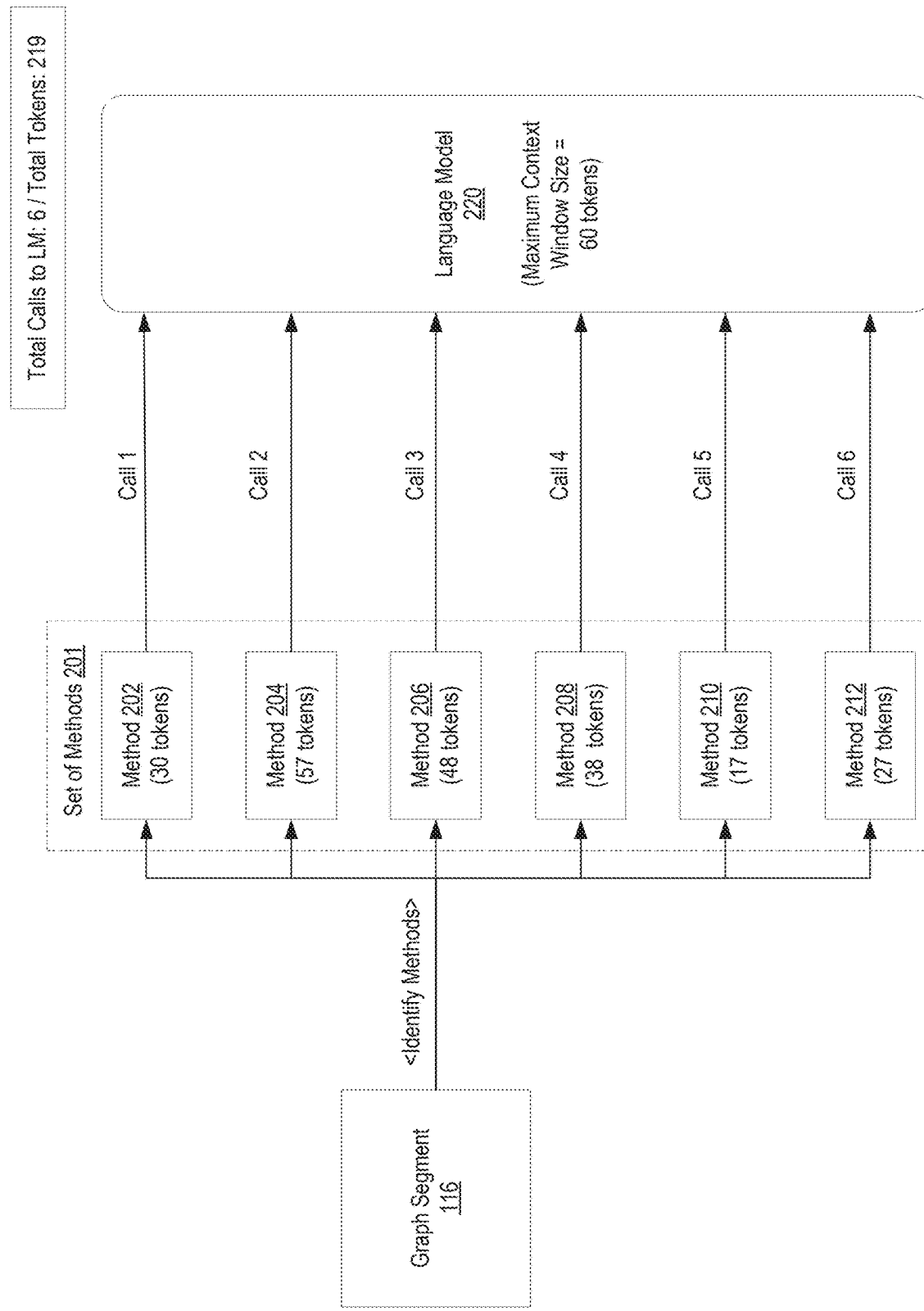
FIG. 2 depicts an example of a process diagram for performing code generation.

Accordingly, FIG. 2 depicts an example diagram of a conventional method for eliminating redundant contexts for improved response generation that can be used to provide all of the necessary context while decreasing the token length of the input context to accommodate the context window of an LM. As shown in FIG. 2, a set of methods 201 is identified in graph segment 116. Set of methods 201 comprises method 202, method 204, method 206, method 208, method 210, and method 212. Method 202 comprises a context size of 30 tokens, method 204 comprises a context size of 57 tokens, method 206 comprises a context size of 48 tokens, method 208 comprises a context size of 38 tokens, method 210 comprises a context size of 17 tokens, and method 212 comprises a context size of 27 tokens. Thus, set of methods 201 comprises a total of 219 tokens. In some aspects, LM service 110 utilizes LM 220 that has a maximum context window size of 60 tokens for inputs. Therefore, if the entire set of methods 201 was provided to LM 220, 159 tokens of the 219 total tokens would be truncated. One way to avoid truncation is to provide each method separately to LM 220. This would result in a total of six calls to the LM, which would process a total of 219 tokens between the different methods.

Each call to LM 220 may require significant computational resources. For example, each call activates the model's neural network architecture, which can involve billions of parameters that need to be loaded into GPU memory and processed through multiple transformer layers. Accordingly, computational resources needed to execute an LM call include memory bandwidth and processing compute to process the weights and activations of the different transformer layers. If LM service 110 utilizes a third-party LM, third parties typically determine costs of using their services based on the number of API calls, the token count of API calls, and size of model being called. Therefore, computational resources and costs can accumulate quickly as more API calls are executed to complete a response generation task.

Figure 3:
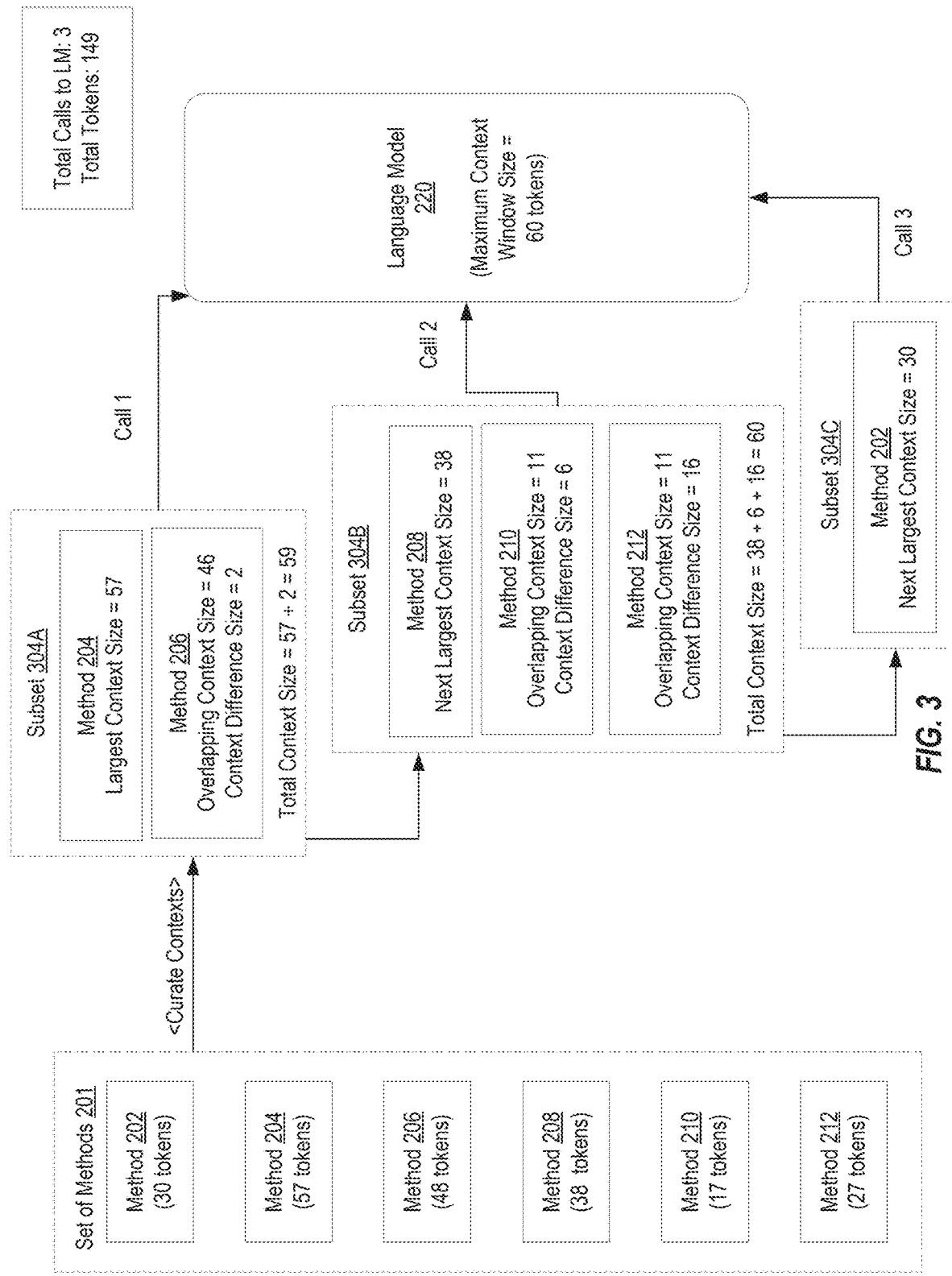
FIG. 3 depicts an example of a process diagram for curating context to perform enhanced code generation.

FIG. 3 depicts an example of a process diagram for curating model inputs to improve response generation efficiency by eliminating redundancies in input contexts. Components and elements of FIG. 3 are described in reference to FIGS. 4-7 to provide additional examples and details of the iterative process for curating contexts and eliminating redundancies. In particular, a set of methods 201 is identified in a graph segment, such as graph segment 116 of FIG. 1. The set of methods 201 is then curated into one or more subsets of methods in order to identify and eliminate redundant contexts associated with the different methods of the set of methods 201.

In some aspects, the set of methods 201 comprises a plurality of methods such as calculateAverageScore, validateUserCredentials, retrieveAllProducts, updateEmployeeRecord, sortStudentList, and saveOrderDetails as shown in Iteration 1 of FIG. 4. Each method is broken down into discrete groupings of context token sizes based on one or more tokens relating to the same portion of the method. A total context size is determined for each method as well.

As an example, the method for calculateAverageScore has relationships with at least 3 other nodes in the code graph.

Each related node will need a specific number of tokens to be represented in the prompt. In this case, 10, 11, and 9 tokens will be needed to represent the 3 different nodes, respectively. When building the context for the prompts to the model, these token counts (10, 11, and 9) make up the variable portion of the context that describes the method's relationships within the code graph. Thus, when compressing context for the prompts to the model, several methods may often share similar token breakdowns (i.e., some methods may have the same relationships with certain nodes as other methods). The implementation uses a mapping between code chunks and their corresponding token sizes. When preparing context for the prompts, this mapping helps the compression algorithm to select the most appropriate code chunks for inclusion. Accordingly, in this compression algorithm, code chunks with the same token size can be treated equivalently, as their individual distinctions will not impact the context curating process.

In some aspects, subset 304A from the set of methods 201 is determined by identifying that method 204 (e.g., validateUserCredentials) has the largest context size of the set of methods 201 at 57 tokens. Next, the system, such as system 100 of FIG. 1, is configured to determine an overlapping context size between method 204 and each other method of the set of methods 201.

For example, as shown in Step 1 of FIG. 4, retrieveAllProducts has an overlapping context size of 46 with respect to validateUserCredentials, calculateAverageScore has an overlapping context size of 21 with respect to validateUserCredentials, and sortStudentList, saveOrderDetails, and updateEmployeeRecord each have an overlapping context size of 11 with respect to validateUserCredentials.

The system then selects a maximum number of other methods of the set of methods 201 in order of decreasing overlapping context size with respect to method 204, such that a total context size of the maximum number of other methods of the set of methods 201 does not exceed a maximum context window size (e.g., 60 tokens) associated with LM 220. As shown in FIG. 3, method 206 (e.g., retrieveAllProducts) is determined to have an overlapping context size of 46 tokens, which is the greatest overlapping context size of any other method with respect to method 204 and a context difference size of 2 tokens with respect to method 204. Method 206 is added to subset 304A. For example, as shown in FIG. 4, retrieveAllProducts is added to the bucket at Step 2.

At this point, the total context size of subset 304A is 59 tokens (e.g., the 57 unique tokens of method 204 and the 2 unique tokens of method 206). Only unique tokens of the methods included in a subset of methods will be provided to LM 220, so that the total context size of the subset of methods can be based on the unique tokens, while excluding overlapping tokens. The system will check the next method with the next largest overlapping context size with respect to method 204. In this example, adding another method (e.g., calculateAverageScore) with the next largest overlapping context with respect to method 204 will cause the total context size of subset 304A to exceed the maximum context window size of LM 220. Thus, subset 304A is complete and the system can provide subset 304A to LM 220 to generate the test case.

In some aspects, the system determines that additional methods remain in the set of methods 201 that are needed to provide the complete context to generate the test case. Therefore, the system will determine the method that has the largest context size of the remaining methods not included in subset 304A. Of the remaining methods from the set of methods 201 not included in subset 304A, method 208 (e.g., updateEmployeeRecord) has the next largest context size at 38 tokens. The system follows the same process as with subset 304A and determines an overlapping context size of each of the remaining methods with respect to method 208. For example, at Iteration 2, Step 1 of FIG. 5, it is determined that sortStudentList, saveOrderDetails, and calculateAverageScore each have an overlapping context size of 11 tokens with respect to updateEmployeeRecord.

If the system determines that two or more other methods of the set of methods comprise a same overlapping context size with respect to the first method, the system will employ a tie-breaker to determine which method is added to subset 304B first by determining a context size difference between the first method and each other method of the set of methods and sorting the methods in increasing order of context size difference. The method with the least context difference size will then be added first. As shown in FIG. 3, method 210 (e.g., sortStudentList) has a context difference size of 6, while method 212 (e.g., saveOrderDetails) has a context difference size of 16, so method 210 is added first to subset 304B.

At this point (e.g., Step 2(a) of Iteration 2 of FIG. 5), the system determines that the total context size of subset 304B with method 208 and method 210 is 44 and analyzes whether adding the next method with the next largest overlapping context size and next least context size difference will cause the total context size of subset 304B to exceed the maximum content window size of LM 220. In this case, adding method 212 (e.g., saveOrderDetails) with the overlapping context size of 11 and context difference size of 16 will result in a total context size of subset 304B to be 60 tokens. Because this is equal to the maximum context window size of LM 220, method 212 is also added to subset 304B. Because the total context window size is now equal to the maximum context window size of LM 220, the system will determine that subset 304B is complete and not continue to analyze whether additional methods may be added to subset 304B. In this manner, the maximum number of other methods of the set of methods is selected in order of decreasing overlapping context size and in order of increasing context size difference with respect to method 208.

However, the system will still determine whether any methods of the set of methods 201 remain and were not included in either subset 304A or subset 304B. In this example, method 202 (e.g., calculateAverageScore) has not been included in any previous subsets. Thus, method 202 is added to subset 304C. Because it is the final method of the set of methods 201, the system will determine subset 304C to be complete and provide subset 304C to LM 220. This is shown in Iteration 3 of FIG. 6, wherein no remaining methods are shown that are not included in a defined subset of methods. In some aspects, where additional methods remain in the set of methods 201, the system is configured to continue generating subsets of methods until every method of the set of methods is selected to be part of a subset of methods.

Beneficially, by curating the set of methods 201 into the various subsets of methods as shown in FIG. 3, the system was able to reduce the number of calls to LM 220 to three calls from six calls and reduce the total number of tokens across all calls to 149, as opposed to 219 tokens which is the total number of tokens of all methods of the set of methods 201. A summary of the differences between calling each method of the set of methods 201 separately as six calls versus curating the set of methods into a plurality of subsets is illustrated in FIG. 7. For example, FIG. 7 shows that the number of LLM calls was reduced by 50% and the total number of tokens was reduced by 31.96%. While the specific reductions may vary based on the number and context sizes of the methods identified in the graph segment, curating the methods to identify and remove redundant contexts will cause the number of LLM calls and total number of tokens to be reduced. Accordingly, by reducing the number of calls and the number of tokens across all calls to LM 220, disclosed systems and methods described herein reduce the number of computational resources needed to process the set of methods 201, while preventing any context loss from occurring. This ensures that the test case is generated more efficiently while retaining accuracy.

Graph Knowledge Bases

Figure 8:
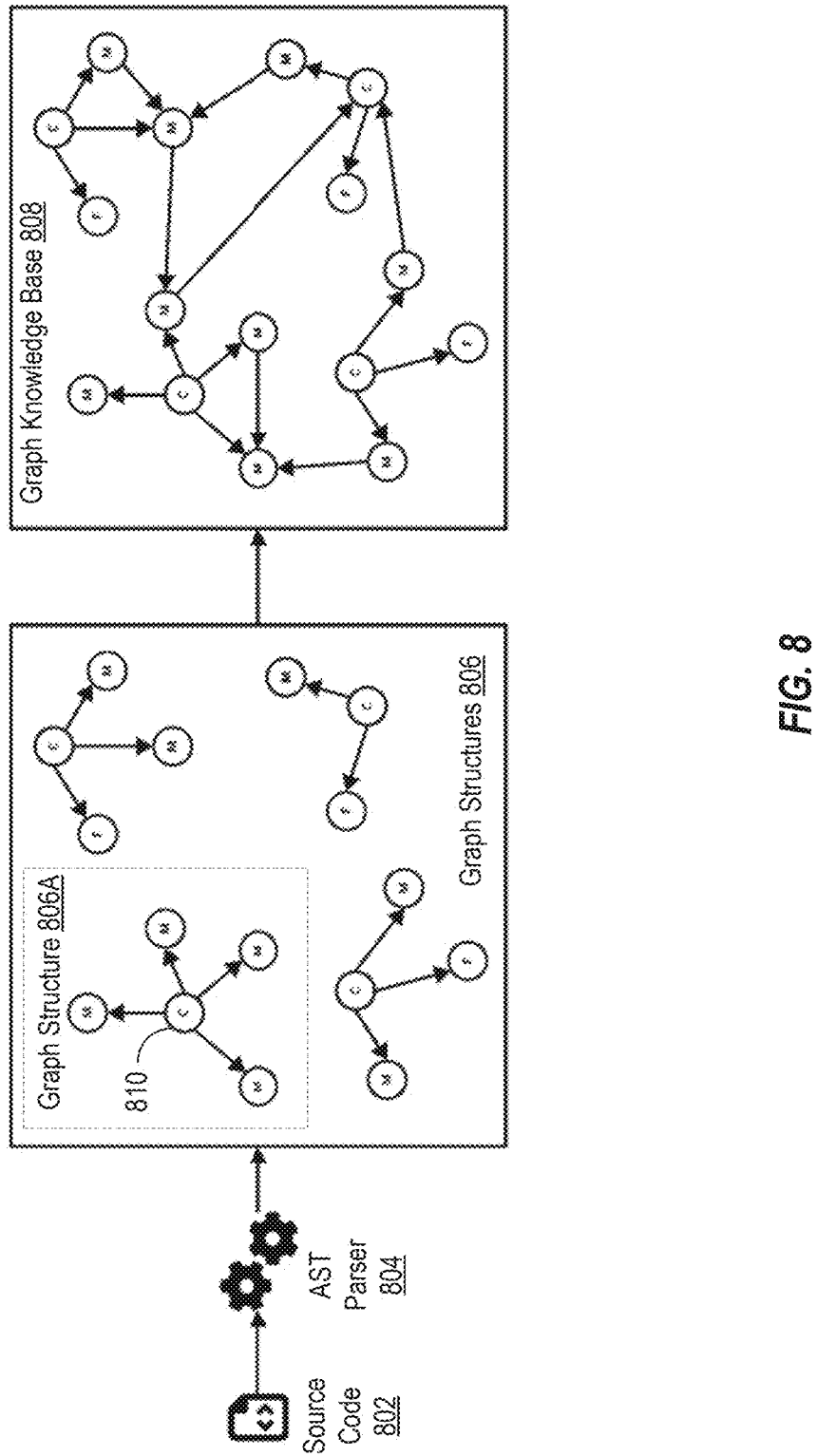
FIG. 8 depicts an example diagram for generating a graph knowledge base.

FIG. 8 depicts an example diagram for generating a graph knowledge base. In particular, FIG. 8 depicts source code 802 that is parsed into one or more graph structures 806 which are linked together to generate graph knowledge base 808. In some aspects, source code 802 is parsed using abstract syntax tree (AST) parser 804, which is configured to process computer code and convert it into one or more tree-like data structures, such as graph structure 806A, that represents the hierarchal syntax of a portion of source code 802. For example, the AST parser 804 is configured to recognize entities in source code 802, such as classes, methods, and fields, wherein each node in graph structure 806A represents a particular entity that was identified in source code 802. Additionally, AST parser 804 is configured to identify relationships between the different entities and represent those relationships with edges linking the related nodes to generate one or more graph structures 806. For example, graph structure 806A comprises node 810 representing a class identified in source code 802 and a plurality of additional nodes representing different methods referenced within the identified class. The plurality of additional nodes is linked to node 810 with a plurality of edges linking each additional node to node 810. In some aspects, graph structures 806 comprise first degree related entities.

In some aspects, AST parser 804 is configured to identify one or more classes with source code 104 and parse the source code 104 into one or more graph structures 806 based on the one or more classes. In addition to identifying relationships between entities identified in source code 802 to generate graph structures 806, AST parser 804 also identifies dependencies between graph structures 806 in order to link the graph structures 806 together. For example, in some aspects, a class in on graph structure may reference a field or method in another graph structure. By linking nodes of different graph structures together, code generation system 100 is able to generate graph knowledge base 808, which is an integrated and multi-level graph structure. The relationships between graph structures 806 are indicated by edges between the nodes of different graph structures, as shown in graph knowledge base 808. By generating the graph knowledge base 808 in this manner, graph knowledge base 808 represents the hierarchal syntax and functionality of source code 802, including all of the classes, methods, fields, and their relationships as identified in source code 802.

Beneficially, generating graph knowledge base 808 to represent source code 802 removes irrelevant syntax details like whitespace and comments that might distract a downstream application or model without losing important context provided by the structural and semantic relationships between code elements. Accordingly, graph knowledge base 808 provides a normalized representation that reduces stylistic variations or code-language dependencies, allowing downstream applications to focus on the underlying logic rather than implementation details. Thus, by using graph knowledge base 808 will be more token-efficient when being processed by a machine learning model, such as an LM, thereby allowing code generation system 100 to capture more context within the context window of the LM. Graph knowledge base 808 may also be easier to analyze and determine complex nested structures and relationships than trying to analyze source code 802 directly. This can lead to improved accuracy in code analysis, generation, and modification tasks performed by code generation system 100.

In some instances, code generation system 100 may only need a portion of graph knowledge base 808 in order to perform the pending code generation task. In such instances, code generation system 100 is configured to extract a graph segment of graph knowledge base 808. Where graph knowledge base 808 comprises a set of entities identified in source code 802, a graph segment extracted from graph knowledge base 808 comprises a subset of the set entities identified in source code 802. In some aspects, code generation system 100 is configured to extract a graph segment based on a particular code generation use case type and corresponding target entity for which to generate code for the code generation use case. Accordingly, FIG. 9 depicts various examples for generating different graph segments from graph knowledge base 808 based on a type of code generation use case and target entity, for example, test case type 113 and target entity 114 of FIG. 1.

Graph Segments

Figure 9:
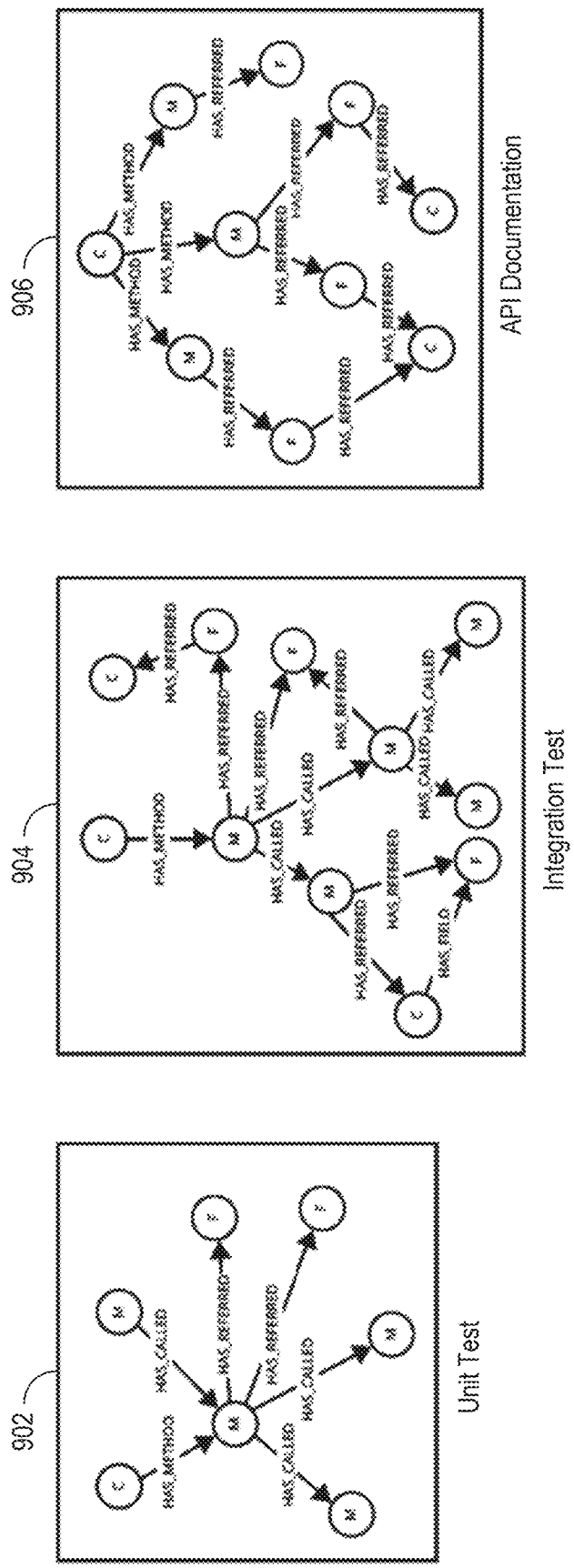
FIG. 9 depicts various examples for generating different graph segments from a graph knowledge base based on a type of code generation use case.

In particular, FIG. 9 depicts graph segment 902 for a unit test, graph segment 904 for an integration test, and graph segment 906 for API documentation. In some aspects, graph segment 902 is generated based on identifying the target entity within graph knowledge base 808. In some aspects, the target entity for a unit test is a target method referenced in source code 802. Next, code generation system 100 identifies one or more entities related to the target method based on the unit test type to be generated and extracts graph segment 902. Accordingly, graph segment 902 comprises the node representing the target method and one or more nodes representing the one or more entities related to the target method. In some aspects, the related entities for a unit test comprise neighbor entities with a first degree or direct connection with the target entity, as shown in FIG. 1. By extracting graph segment 902 in this manner, code generation system 100 is able to capture all of the nodes needed to provide sufficient context for generating the unit test for the target method.

In some aspects, graph segment 904 is generated based on identifying the target entity within graph knowledge base 808 of FIG. 8. In some aspects, the target entity for an integration test is a target method referenced in source code 802 of FIG. 8. Next, code generation system 100 identifies one or more entities related to the target method based on the integration test type and extracts graph segment 904. Accordingly, graph segment 904 comprises the node representing the target method and one or more additional nodes representing the one or more entities related to the target method. In some aspects, the related entities for an integration test comprise neighbor entities with a first degree or direct connection with the target method and one or more additional entities that have a second, third, etc. degree connection with the target method. By extracting graph segment 904 in this manner, code generation system 100 is able to capture all of the nodes needed to provide sufficient context for generating the integration test for the target method.

In some aspects, graph segment 906 is generated based on identifying the target entity within graph knowledge base 808 of FIG. 8. In some aspects, the target entity for API documentation is a target class referenced in source code 802 of FIG. 8. Next, code generation system 100 identifies one or more entities related to the target class based on the API documentation test type and extracts graph segment 906. Accordingly, graph segment 906 comprises the node representing the target class and one or more additional nodes representing the one or more entities related to the target class. In some aspects, the related entities for API documentation comprise neighbor entities with a first degree or direct connection with the target method and one or more additional entities that have a second, $3^{rd}$, etc. degree connection with the target class. By extracting graph segment 906 in this manner, code generation system 100 is able to capture all of the nodes needed to provide sufficient context for generating the API documentation for the target class.

Accordingly, code generation system 100 is able to extract custom graph segments based on the target entity, code generation use case type, and depth and breadth of context (e.g., extent of entities) needed to generate an accurate and comprehensive code generation use case for the target entity. Notably, any one of graph segment 902, graph segment 904, graph segment 906, or other graph segment extracted from graph knowledge base 808 of FIG. 8 may further processed according to systems and methods described herein for eliminating redundancies in curated contexts for facilitating improved code generation.

Example Method for Code Generation

Figure 10:
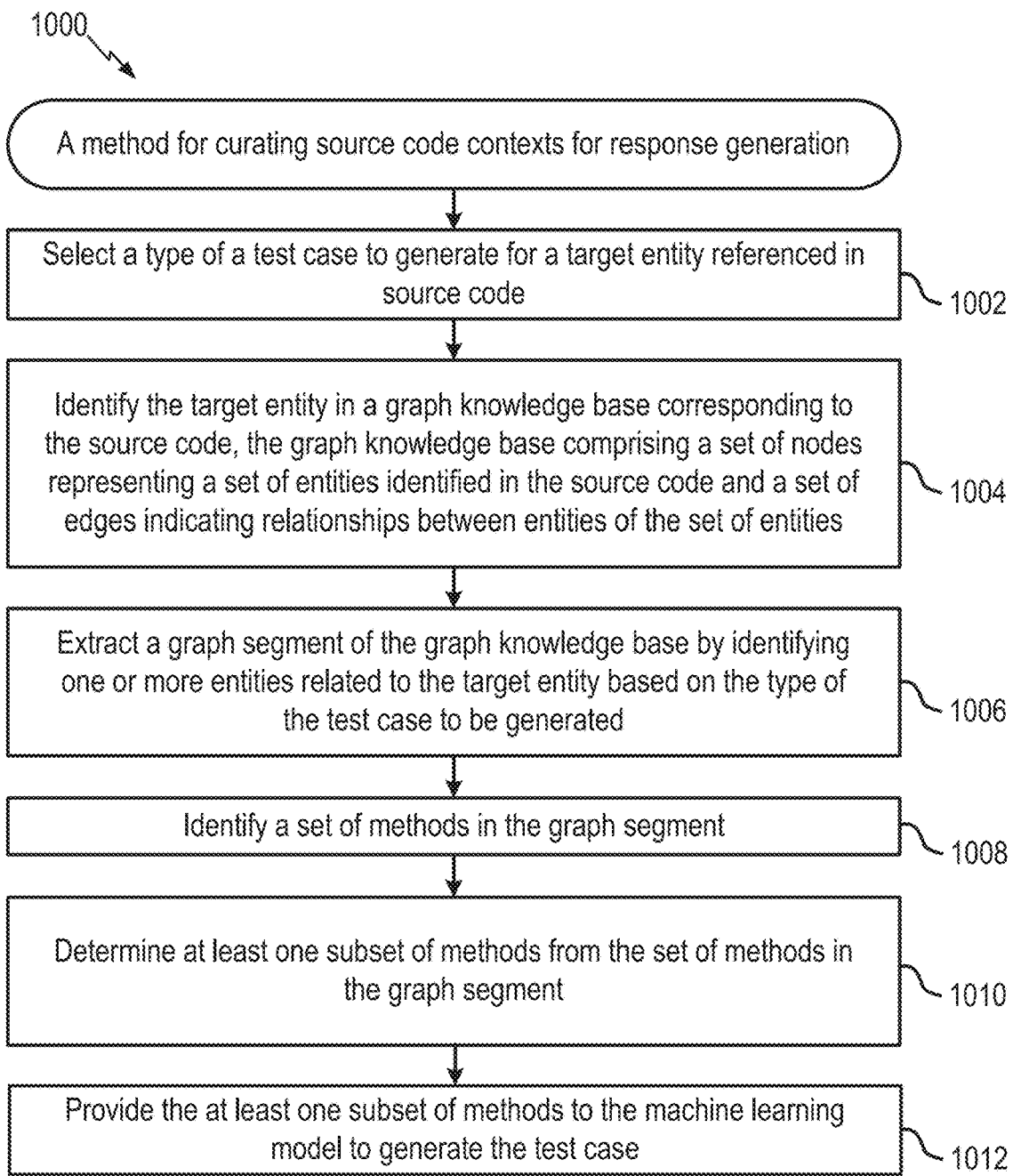
FIG. 10 depicts a method for performing code generation.

FIG. 10 depicts an example method 1000 for curating source code contexts for response generation. In one aspect, method 1000 can be implemented by the system 100 of FIG. 1 and/or processing system 1100 of FIG. 11.

Figure 11:
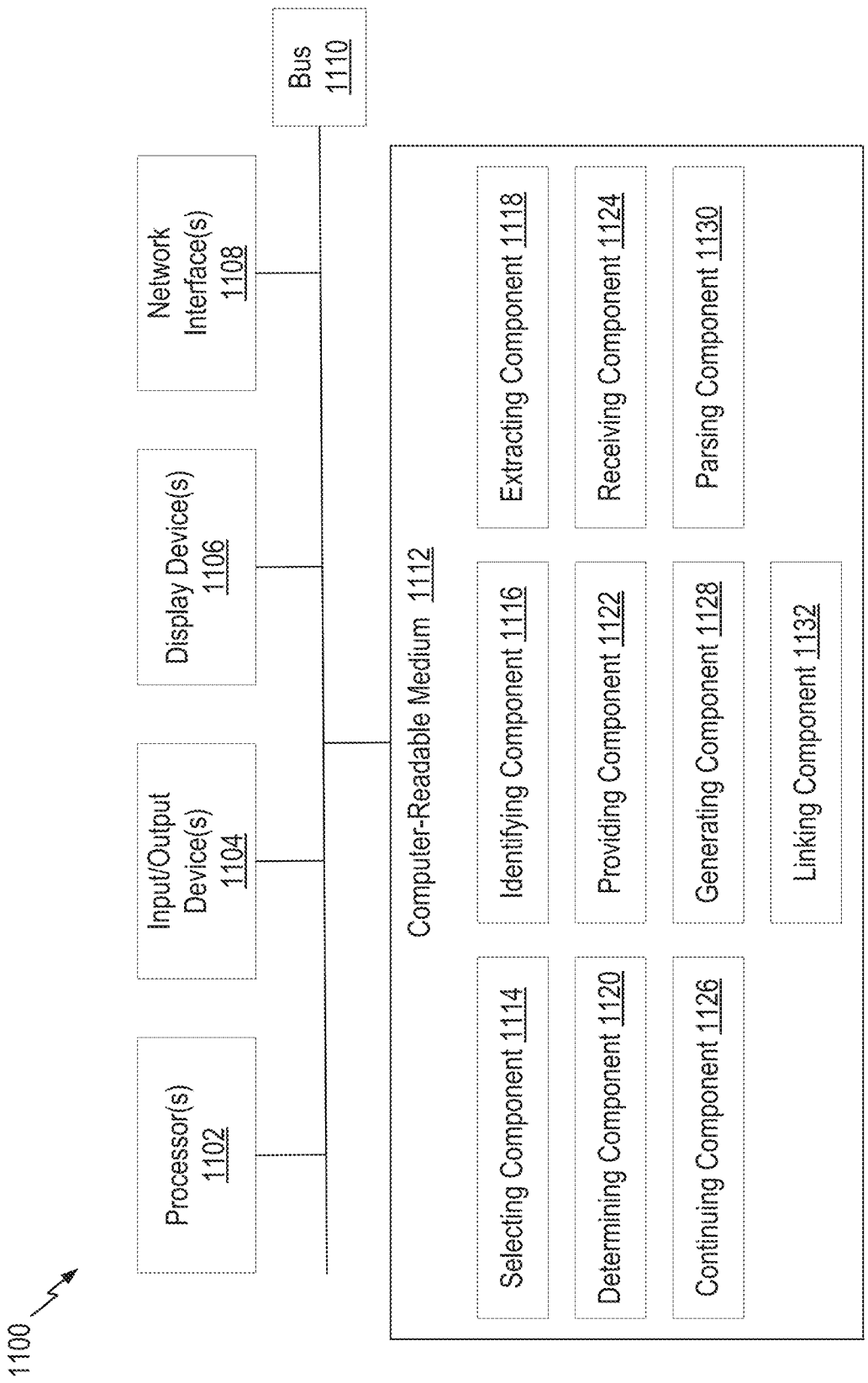
FIG. 11 depicts an example processing system with which aspects of the present disclosure can be performed.

Method 1000 starts at block 1002 with selecting a type of a code generation use case to generate for a target entity referenced in source code. In some aspects, selecting component 1114 of FIG. 11 is configured to select test case type 113 of FIG. 1 to generate for target entity 114 of FIG. 1 in source code 104 of FIG. 1.

Method 1000 continues to block 1004 with identifying the target entity in a graph knowledge base corresponding to the source code, the graph knowledge base comprising a set of nodes representing a set of entities identified in the source code and a set of edges indicating relationships between entities of the set of entities. In some aspects, identifying component 1116 of FIG. 11 is configured to identify target entity 114 in graph knowledge base 112 of FIG. 1.

Method 1000 continues to block 1006 with extracting a graph segment of the graph knowledge base by identifying one or more entities related to the target entity based on the type of the code generation use case to be generated. In some aspects extracting component 1118 of FIG. 11 extracts graph segment 116 of FIG. 1 from graph knowledge base 112 by identifying one or more entities related to target entity 114 based on the test case type 113 to be generated.

Method 1000 continues to block 1008 with identifying a set of methods in the graph segment. In some aspects, identifying component 1116 of FIG. 11 is configured to identify a set of methods 118 of FIG. 1 in graph segment 116.

Method 1000 continues to block 1010 with determining at least one subset of methods from the set of methods in the graph segment. In some aspects, block 1010 further includes: identifying a first method of the set of methods that has a largest context size of the set of methods, determining an overlapping context size between the first method and each other method of the set of methods, and selecting a maximum number of other methods of the set of methods in order of decreasing overlapping context size with respect to the first method, such that a total context size of the maximum number of other methods of the set of methods and the first method does not exceed a maximum context window size associated with a machine learning model. In some aspects, determining component 1120 of FIG. 11 is configured to determine subset 304A of FIG. 3 from set of methods 201.

Method 1000 continues to block 1012 with providing the at least one subset of methods to the machine learning model to generate the code generation use case. In some aspects, providing component 1122 of FIG. 11 provide subset 304A to LM 220 of FIG. 3 to generate a code generation use case, such as test case 102 of FIG. 1.

In some aspects, method 1000 further includes determining that two or more other methods of the set of methods comprise a same overlapping context size with respect to the first method. In some aspects, determining component 1120 of FIG. 11 is configured to determine that method 210 of FIG. 3 and method 212 of FIG. 3 have the same overlapping context size with respect to method 208 of FIG. 3.

In some aspects, method 1000 further includes determining a context size difference between the first method and each other method of the set of methods, wherein the maximum number of other methods of the set of methods is selected in order of decreasing overlapping context size and in order of increasing context size difference with respect to the first method. In some aspects, determining component 1120 of FIG. 11 is configured to determine a context size difference between method 210 and method 208 and a context size difference between method 212 and method 208, wherein subset 304B comprises method 208, method 210, and method 212 selected in that order.

In some aspects, method 1000 further includes providing the at least one subset of methods as context to a prompt builder. In some aspects, providing component 1122 of FIG. 11 is configured to provide a subset of methods of the set of method 118 as context 120 of FIG. 1 to prompt builder 108 of FIG. 1.

In some aspects, method 1000 further includes receiving a prompt from the prompt builder, the prompt configured to instruct the machine learning model on how to process the at least one subset of methods to generate the code generation use case based on the target entity and the type of the code generation use case. In some aspects, receiving component 1124 of FIG. 11 is configured to receive prompt 122 of FIG. 1, wherein prompt 122 is configured to instruct CodeGen service 106 and/or LM service 110 on how to process context 120 to generate test case 102 based on test case type 113 and target entity 114.

In some aspects, method 1000 further includes continuing to generate subsets of methods until every method of the set of methods is selected to be part of a subset of methods. In some aspects, continuing component 1126 of FIG. 11 is configured to continue generating subsets of methods, for example subset 304C, until every method of the set of methods 201 is selected to be a part of a subset of methods.

In some aspects, providing the at least one subset of methods to the machine learning model to generate the code generation use case occurs in response to determining that every method of the set of methods is included in the at least one subset of methods. In some aspects, providing component 1122 of FIG. 11 is configured to provide subset 304C to LM 220 in response to determining that every method of the set of methods 201 is included in at least one subset of methods.

In some aspects, method 1000 further includes determining one or more remaining methods that were not included in the at least one subset of methods. In some aspects, determining component 1120 of FIG. 11 is configured to determine that one or more remaining methods of the set of methods 201 that were not included in the at least one subset of methods, for example subset 304A.

In some aspects, method 1000 further includes identifying a second method of the one or more remaining methods that has the largest context size of the one or more remaining methods. In some aspects, identifying component 1116 of FIG. 11 is configured to identify method 208 as the remaining method of the set of methods 201 that has the largest context size of the one or more remaining methods not included in subset 304A.

In some aspects, method 1000 further includes determining the overlapping context size between the second method and each other method of the one or more remaining methods. In some aspects, determining component 1120 of FIG. 11 is configured to determine the overlapping context size between method 208 and each other methods of the one or more remaining methods not included in subset 304A.

In some aspects, method 1000 further includes determining that a total context size of the second method and any other remaining method exceeds the maximum context window size associated with the machine learning model. In some aspects, determining component 1120 of FIG. 11 is configured to determine that a total context size of the second method and any other remaining method exceeds the maximum context window size of LM 220, or in some aspects, that the total context size of the one or more methods already included in a particular subset of methods, such as subset 304A, and an additional method not yet assigned to a subset of methods would exceed the maximum context window size of LM 220.

In some aspects, method 1000 further includes providing the second method to the machine learning model to generate an additional portion of the code generation use case. In some aspects, providing component 1122 of FIG. 11 is configured to provide the second method to LM 220 to generate an additional portion of test case 102.

In some aspects, method 1000 further includes generating the graph knowledge base by: identifying one or more classes within source code. In some aspects, generating component 1128 of FIG. 11 is configured to generate graph knowledge base 808 by identifying one or more classes within source code 802 of FIG. 8.

In some aspects, method 1000 further includes parsing the source code into one or more graph structures based on the one or more classes. In some aspects, parsing component 1130 of FIG. 11 is configured to parse source code 802 of FIG. 8 using AST parser 804 of FIG. 8 to generate one or more graph structures 806 of FIG. 8.

In some aspects, method 1000 further includes identifying dependencies between one or more entities of the one or more graph structures. In some aspects, identifying component 1116 of FIG. 11 identifies dependencies between or more entities of the different graph structures 806.

In some aspects, method 1000 further includes linking the one or more graph structures based on the dependencies between the one or more entities of the one or more graph structures to generate the graph knowledge base. In some aspects, linking component 1132 of FIG. 11 is configured to link one or more graph structures 806 to generate graph knowledge base 808.

In some aspects, the target entity is a target method, the code generation use case is a unit test, such as unit test associated with graph segment 902, and method 1000 includes identifying one or more neighbor entities of the target method, wherein the graph segment comprises the target entity and the one or more neighbor entities.

In some aspects, the target entity is a target method, the code generation use case is an integration test, such as integration test associated with graph segment 904, and method 1000 includes identifying one or more chains of methods related to the target method, wherein the graph segment comprises the target entity and the one or more chains of methods related to the target method.

In some aspects, the target entity is a target class, the code generation use case is application programming interface (API) documentation, such as API documentation associated with graph segment 906, and method 1000 includes identifying a set of entities of the target class, the set of entities including one or more methods, one or more fields of the one or more methods, and one or more additional classes that refers to the one or more fields, wherein the graph segment comprises the set of entities of the target class. In some aspects, identifying component 1116 of FIG. 11

Accordingly, aspects of method 1000 provide technical solutions to technical problems associated with existing systems for code generation. In particular, method 1000 addresses the challenge of limited context window sizes of language models by providing a way to optimize the inputs and prompts needed for code generation tasks without losing context for the code generation task. For example, method 1000 takes into account the complex dependencies among classes, methods, and fields in source code, parses the source code, and generates a graph knowledge base that captures all of the entities and their relationships as identified in the original source code. By generating a graph knowledge base, the hierarchical structure of the source code is represented in the graph knowledge base in a way that reduces the token size and provides a way to efficiently identify target entities and related entities.

Thus, depending on the specific objective of the code generation task to perform, such as generating a particular type of code generation use case for the source code, method 1000 traverses the graph knowledge base to gather the relevant contexts and extracts a graph segment. The graph segment is used as the relevant context for code generation. However, prior to being provided to the desired model, the graph segment is compressed to reduce the context size without losing meaningful context. This is accomplished by identifying methods within the graph segment, identifying overlapping contexts between methods, and grouping methods together in a way that maximizes the system's ability to eliminate overlapping contexts. This compression, as embodied in method 1000, beneficially reduces the number of tokens required to represent the context, such that the system is able to provide more context with less tokens and still meet the context window limits of the model. Additionally, this compression reduces the number of calls to the model, resulting in faster and more efficient results that require less computational resources. For example, compute, memory, and power usage are all reduced, in addition to the possibility of network traffic for moving data to and from an LM.

Note that FIG. 10 is just one example of a method, and other methods including fewer, additional, or alternative operations are possible consistent with this disclosure.

Example Processing System for Code Generation

FIG. 11 depicts an example processing system 1100 configured to perform various aspects described herein, including, for example, method 1000 as described above with respect to FIG. 10.

Processing system 1100 is generally an example of an electronic device configured to execute computer-executable instructions, such as those derived from compiled computer code, including without limitation personal computers, tablet computers, servers, smart phones, smart devices, wearable devices, augmented and/or virtual reality devices, and others.

In the depicted example, processing system 1100 includes one or more processor(s) 1102, one or more input/output device(s) 1104, one or more display device(s) 1106, one or more network interface(s) 1108 through which processing system 1100 is connected to one or more networks (e.g., a local network, an intranet, the Internet, or any other group of processing systems communicatively connected to each other), and computer-readable medium 1112. In the depicted example, the aforementioned components are coupled by a bus 1110, which may generally be configured for data exchange amongst the components. Bus 1110 may be representative of multiple buses, while only one is depicted for simplicity.

Processor(s) 1102 are generally configured to retrieve and execute instructions stored in one or more memories, including local memories like computer-readable medium 1112, as well as remote memories and data stores. Similarly, processor(s) 1102 are configured to store application data residing in local memories like the computer-readable medium 1112, as well as remote memories and data stores. More generally, bus 1110 is configured to transmit programming instructions and application data among the processor(s) 1102, display device(s) 1106, network interface(s) 1108, and/or computer-readable medium 1112. In certain embodiments, processor(s) 1102 are representative of a one or more central processing units (CPUs), graphics processing unit (GPUs), tensor processing unit (TPUs), accelerators, and other processing devices.

Input/output device(s) 1104 may include any device, mechanism, system, interactive display, and/or various other hardware and software components for communicating information between processing system 1100 and a user of processing system 1100. For example, input/output device(s) 1104 may include input hardware, such as a keyboard, touch screen, button, microphone, speaker, and/or other device for receiving inputs from the user and sending outputs to the user.

Display device(s) 1106 may generally include any sort of device configured to display data, information, graphics, user interface elements, and the like to a user. For example, display device(s) 1106 may include internal and external displays such as an internal display of a tablet computer or an external display for a server computer or a projector. Display device(s) 1106 may further include displays for devices, such as augmented, virtual, and/or extended reality devices. In various embodiments, display device(s) 1106 may be configured to display a graphical user interface.

Network interface(s) 1108 provide processing system 1100 with access to external networks and thereby to external processing systems. Network interface(s) 1108 can generally be any hardware and/or software capable of transmitting and/or receiving data via a wired or wireless network connection. Accordingly, network interface(s) 1108 can include a communication transceiver for sending and/or receiving any wired and/or wireless communication.

Computer-readable medium 1112 may be a volatile memory, such as a random-access memory (RAM), or a nonvolatile memory, such as nonvolatile random-access memory (NVRAM), or the like. In this example, computer-readable medium 1112 includes selecting component 1114, identifying component 1116, extracting component 1118, determining component 1120, providing component 1122, receiving component 1124, continuing component 1126, generating component 1128, parsing component 1130, and linking component 1132. Processing of the components 1114-1132 may enable and cause the processing system 1100 to perform the method 1000 described with respect to FIG. 10, or any aspect related to it.

In certain embodiments, selecting component 1114 is configured to select a type of a code generation use case to generate for a target entity referenced in source code. In certain embodiments, identifying component 1116 is configured to identify the target entity in a graph knowledge base corresponding to the source code, the graph knowledge base comprising a set of nodes representing a set of entities identified in the source code and a set of edges indicating relationships between entities of the set of entities. In certain embodiments, extracting component 1118 is configured to extract a graph segment of the graph knowledge base by identifying one or more entities related to the target entity based on the type of the code generation use case to be generated.

In certain embodiments, identifying component 1116 is configured to identify a set of methods in the graph segment. In certain embodiments, determining component 1120 is configured to determine at least one subset of methods from the set of methods in the graph segment, including: identifying a first method of the set of methods that has a largest context size of the set of methods; determining an overlapping context size between the first method and each other method of the set of methods; and selecting a maximum number of other methods of the set of methods in order of decreasing overlapping context size with respect to the first method, such that a total context size of the maximum number of other methods of the set of methods and the first method does not exceed a maximum context window size associated with a machine learning model. In certain embodiments, providing component 1122 is configured to provide the at least one subset of methods to the machine learning model to generate the code generation use case.

Note that FIG. 11 is just one example of a processing system consistent with aspects described herein, and other processing systems having additional, alternative, or fewer components are possible consistent with this disclosure.

Example Clauses

Implementation examples are described in the following numbered clauses:

Clause 1: A method for curating source code contexts for response generation, comprising: selecting a type of a code generation use case to generate for a target entity referenced in source code; identifying the target entity in a graph knowledge base corresponding to the source code, the graph knowledge base comprising a set of nodes representing a set of entities identified in the source code and a set of edges indicating relationships between entities of the set of entities; extracting a graph segment of the graph knowledge base by identifying one or more entities related to the target entity based on the type of the code generation use case to be generated; identifying a set of methods in the graph segment; determining at least one subset of methods from the set of methods in the graph segment, including: identifying a first method of the set of methods that has a largest context size of the set of methods, determining an overlapping context size between the first method and each other method of the set of methods, and selecting a maximum number of other methods of the set of methods in order of decreasing overlapping context size with respect to the first method, such that a total context size of the maximum number of other methods of the set of methods and the first method does not exceed a maximum context window size associated with a machine learning model; and providing the at least one subset of methods to the machine learning model to generate the code generation use case.

Clause 2: The method of Clause 1, further comprising: determining that two or more other methods of the set of methods comprise a same overlapping context size with respect to the first method; and determining a context size difference between the first method and each other method of the set of methods, wherein the maximum number of other methods of the set of methods is selected in order of decreasing overlapping context size and in order of increasing context size difference with respect to the first method.

Clause 3: The method of any one of Clauses 1-2, further comprising: providing the at least one subset of methods as context to a prompt builder; and receiving a prompt from the prompt builder, the prompt configured to instruct the machine learning model on how to process the at least one subset of methods to generate the code generation use case based on the target entity and the type of the code generation use case.

Clause 6: The method of Clause 3, further comprising continuing to generate subsets of methods until every method of the set of methods is selected to be part of a subset of methods.

Clause 4: The method of any one of Clauses 1-3, wherein providing the at least one subset of methods to the machine learning model to generate the code generation use case occurs in response to determining that every method of the set of methods is included in the at least one subset of methods.

Clause 5: The method of any one of Clauses 1-4, further comprising: determining one or more remaining methods that were not included in the at least one subset of methods; identifying a second method of the one or more remaining methods that has the largest context size of the one or more remaining methods; determining the overlapping context size between the second method and each other method of the one or more remaining methods; determining that a total context size of the second method and any other remaining method exceeds the maximum context window size associated with the machine learning model; and providing the second method to the machine learning model to generate an additional portion of the code generation use case.

Clause 7: The method of any one of Clauses 1-6, further comprising generating the graph knowledge base by: identifying one or more classes within source code; parsing the source code into one or more graph structures based on the one or more classes; identifying dependencies between one or more entities of the one or more graph structures; and linking the one or more graph structures based on the dependencies between the one or more entities of the one or more graph structures to generate the graph knowledge base.

Clause 8: The method of any one of Clauses 1-7, wherein: the target entity is a target method, the code generation use case is a unit test, and extracting the graph segment of the graph knowledge base by identifying one or more entities related to the target entity based on the type of the code generation use case to be generated comprises identifying one or more neighbor entities of the target method, wherein the graph segment comprises the target entity and the one or more neighbor entities.

Clause 9: The method of any one of Clauses 1-8, wherein: the target entity is a target method, the code generation use case is an integration test, and extracting the graph segment of the graph knowledge base by identifying one or more entities related to the target entity based on the type of the code generation use case to be generated comprises identifying one or more chains of methods related to the target method, wherein the graph segment comprises the target entity and the one or more chains of methods related to the target method.

Clause 10: The method of any one of Clauses 1-9, wherein: the target entity is a target class, the code generation use case is application programming interface (API) documentation, and extracting the graph segment of the graph knowledge base by identifying one or more entities related to the target entity based on the type of the code generation use case to be generated comprises identifying a set of entities of the target class, the set of entities including one or more methods, one or more fields of the one or more methods, and one or more additional classes that refers to the one or more fields, wherein the graph segment comprises the set of entities of the target class.

Clause 11: A processing system, comprising: memory comprising computer-executable instructions; and one or more processors configured to execute the computer-executable instructions and cause the processing system to perform a method in accordance with any one of Clauses 1-10.

Clause 12: A processing system, comprising means for performing a method in accordance with any one of Clauses 1-10.

Clause 13: A non-transitory computer-readable medium storing program code for causing a processing system to perform the steps of any one of Clauses 1-10.

Clause 14: A computer program product embodied on a computer-readable storage medium comprising code for performing a method in accordance with any one of Clauses 1-10.

Additional Considerations

The preceding description is provided to enable any person skilled in the art to practice the various embodiments described herein. The examples discussed herein are not limiting the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented, or a method may be practiced using any number of the aspects set forth herein. In addition, the scope of the disclosure is intended to cover such an apparatus or method that is practiced using other structure, functionality, structure, and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database, or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112 (f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for curating source code contexts for response generation, comprising:
   selecting a type of a code generation use case to generate for a target entity referenced in source code;
   identifying the target entity in a graph knowledge base corresponding to the source code, the graph knowledge base comprising a set of nodes representing a set of entities identified in the source code and a set of edges indicating relationships between entities of the set of entities;
   extracting a graph segment of the graph knowledge base by identifying one or more entities related to the target entity based on the type of the code generation use case to be generated;
   identifying a set of methods in the graph segment;
   determining at least one subset of methods from the set of methods in the graph segment, including:
      identifying a first method of the set of methods that has a largest context size of the set of methods;
      determining an overlapping context size between the first method and each other method of the set of methods; and
      selecting a maximum number of other methods of the set of methods in order of decreasing overlapping context size with respect to the first method, such that a total context size of the maximum number of other methods of the set of methods and the first method does not exceed a maximum context window size associated with a machine learning model; and
   providing the at least one subset of methods to the machine learning model to generate code for the code generation use case.

2. The method of claim 1, further comprising:
   determining that two or more other methods of the set of methods comprise a same overlapping context size with respect to the first method; and
   determining a context size difference between the first method and each other method of the set of methods;
   wherein the maximum number of other methods of the set of methods is selected in order of decreasing overlapping context size and in order of increasing context size difference with respect to the first method.

3. The method of claim 1, further comprising:
   providing the at least one subset of methods as context to a prompt builder; and
   receiving a prompt from the prompt builder, the prompt configured to instruct the machine learning model on how to process the at least one subset of methods to generate the code generation use case based on the target entity and the type of the code generation use case.

4. The method of claim 1, wherein providing the at least one subset of methods to the machine learning model to generate the code generation use case occurs in response to determining that every method of the set of methods is included in the at least one subset of methods.

5. The method of claim 1, further comprising:
   determining one or more remaining methods that were not included in the at least one subset of methods;
   identifying a second method of the one or more remaining methods that has the largest context size of the one or more remaining methods;
   determining the overlapping context size between the second method and each other method of the one or more remaining methods;
   determine that a total context size of the second method and any other remaining method exceeds the maximum context window size associated with the machine learning model; and
   providing the second method to the machine learning model to generate an additional portion of the code generation use case.

6. The method of claim 5, further comprising continuing to generate subsets of methods until every method of the set of methods is selected to be part of a subset of methods.

7. The method of claim 1, further comprising generating the graph knowledge base by:

identifying one or more classes within source code;
parsing the source code into one or more graph structures based on the one or more classes;
identifying dependencies between one or more entities of the one or more graph structures; and
linking the one or more graph structures based on the dependencies between the one or more entities of the one or more graph structures to generate the graph knowledge base.

8. The method of claim 1, wherein:
the target entity is a target method,
the code generation use case is a unit test, and
extracting the graph segment of the graph knowledge base by identifying one or more entities related to the target entity based on the type of the code generation use case to be generated comprises identifying one or more neighbor entities of the target method, wherein the graph segment comprises the target entity and the one or more neighbor entities.

9. The method of claim 1, wherein:
the target entity is a target method,
the code generation use case is an integration test, and
extracting the graph segment of the graph knowledge base by identifying one or more entities related to the target entity based on the type of the code generation use case to be generated comprises identifying one or more chains of methods related to the target method, wherein the graph segment comprises the target entity and the one or more chains of methods related to the target method.

10. The method of claim 1, wherein:
the target entity is a target class,
the code generation use case is application programming interface (API) documentation, and
extracting the graph segment of the graph knowledge base by identifying one or more entities related to the target entity based on the type of the code generation use case to be generated comprises identifying a set of entities of the target class, the set of entities including one or more methods, one or more fields of the one or more methods, and one or more additional classes that refers to the one or more fields, wherein the graph segment comprises the set of entities of the target class.

11. A processing system, comprising: memory comprising computer-executable instructions; and one or more processors configured to execute the computer-executable instructions and cause the processing system to:
select a type of a code generation use case to generate for a target entity referenced in source code;
identify the target entity in a graph knowledge base corresponding to the source code, the graph knowledge base comprising a set of nodes representing a set of entities identified in the source code and a set of edges indicating relationships between entities of the set of entities;
extract a graph segment of the graph knowledge base by identifying one or more entities related to the target entity based on the type of the code generation use case to be generated;
identify a set of methods in the graph segment;
determine at least one subset of methods from the set of methods in the graph segment, including:
identifying a first method of the set of methods that has a largest context size of the set of methods;
determining an overlapping context size between the first method and each other method of the set of methods; and
selecting a maximum number of other methods of the set of methods in order of decreasing overlapping context size with respect to the first method, such that a total context size of the maximum number of other methods of the set of methods and the first method does not exceed a maximum context window size associated with a machine learning model; and
provide the at least one subset of methods to the machine learning model to generate the code generation use case.

12. The processing system of claim 11, wherein the one or more processors are configured to execute the computer-executable instructions and cause the processing system to:
determine that two or more other methods of the set of methods comprise a same overlapping context size with respect to the first method; and
determine a context size difference between the first method and each other method of the set of methods, wherein the maximum number of other methods of the set of methods is selected in order of decreasing overlapping context size and in order of increasing context size difference with respect to the first method.

13. The processing system of claim 11, wherein the one or more processors are configured to execute the computer-executable instructions and cause the processing system to:
provide the at least one subset of methods as context to a prompt builder; and
receive a prompt from the prompt builder, the prompt configured to instruct the machine learning model on how to process the at least one subset of methods to generate the code generation use case based on the target entity and the type of the code generation use case.

14. The processing system of claim 13, wherein the one or more processors are configured to execute the computer-executable instructions and cause the processing system to:
continue to generate subsets of methods until every method of the set of methods is selected to be part of a subset of methods.

15. The processing system of claim 11, wherein the one or more processors are configured to execute the computer-executable instructions and cause the processing system to provide the at least one subset of methods to the machine learning model to generate the code generation use case occurs in response to determining that every method of the set of methods is included in the at least one subset of methods.

16. The processing system of claim 11, wherein the one or more processors are configured to execute the computer-executable instructions and cause the processing system to:
determine one or more remaining methods that were not included in the at least one subset of methods;
identify a second method of the one or more remaining methods that has the largest context size of the one or more remaining methods;
determine the overlapping context size between the second method and each other method of the one or more remaining methods;
determine that a total context size of the second method and any other remaining method exceeds the maximum context window size associated with the machine learning model; and
provide the second method to the machine learning model to generate an additional portion of the code generation use case.

17. The processing system of claim 11, wherein the one or more processors are configured to execute the computer-executable instructions and cause the processing system to generate the graph knowledge base by:
  identifying one or more classes within source code;
  parse the source code into one or more graph structures based on the one or more classes;
  identify dependencies between one or more entities of the one or more graph structures; and
  link the one or more graph structures based on the dependencies between the one or more entities of the one or more graph structures to generate the graph knowledge base.

18. The processing system of claim 11, wherein:
the target entity is a target method,
the code generation use case is a unit test, and
to cause the processing system to extract the graph segment of the graph knowledge base by identifying one or more entities related to the target entity based on the type of the code generation use case to be generated, the one or more processors are configured to execute the computer-executable instructions and cause the processing system to identify one or more neighbor entities of the target method, wherein the graph segment comprises the target entity and the one or more neighbor entities.

19. The processing system of claim 11, wherein:
the target entity is a target method,
the code generation use case is an integration test, and
to cause the processing system to extract the graph segment of the graph knowledge base by identifying one or more entities related to the target entity based on the type of the code generation use case to be generated, the one or more processors are configured to execute the computer-executable instructions and cause the processing system to identify one or more chains of methods related to the target method, wherein the graph segment comprises the target entity and the one or more chains of methods related to the target method.

20. The processing system of claim 11, wherein:
the target entity is a target class,
the code generation use case is application programming interface (API) documentation, and
to cause the processing system to extract the graph segment of the graph knowledge base by identifying one or more entities related to the target entity based on the type of the code generation use case to be generated, the one or more processors are configured to execute the computer-executable instructions and cause the processing system to identify a set of entities of the target class, the set of entities including one or more methods, one or more fields of the one or more methods, and one or more additional classes that refers to the one or more fields, wherein the graph segment comprises the set of entities of the target class.

* * * * *